United States Patent [19]

Moore et al.

[11] Patent Number: 5,621,610

[45] Date of Patent: Apr. 15, 1997

[54] COLLAPSIBLE COMPUTER KEYBOARD STRUCTURE WITH ASSOCIATED COLLAPSIBLE POINTING STICK

[75] Inventors: Paul M. Moore, Spring; Charles Sellers, Houston, both of Tex.

[73] Assignee: Compaq Computer Corporation, Houston, Tex.

[21] Appl. No.: 658,001

[22] Filed: Jun. 4, 1996

Related U.S. Application Data

[63] Continuation-in-part of Ser. No. 268,818, Jun. 30, 1994, Pat. No. 5,532,904.

[51] Int. Cl.$^6$ .............................. G06F 1/16; H01H 21/06
[52] U.S. Cl. ............................................. 361/680; 345/160
[58] Field of Search .................. 364/708.1; 345/160, 345/161, 168, 169, 184; 400/472, 479, 488–492, 682, 691–693; 200/5 A, 6 A; 361/680, 683

[56] References Cited

U.S. PATENT DOCUMENTS 5,521,596  5/1996  Selker et al. ........................ 345/161 X

OTHER PUBLICATIONS

IBM Technical Disclosure Bulletin vol. 31, No. 11, Apr. 1989, pp. 288 and 289 entitled "Telescopic Joystick", copy in 361–680.

*Primary Examiner*—Michael W. Phillips
*Attorney, Agent, or Firm*—Konneker & Smith

[57] ABSTRACT

A notebook computer is provided with a collapsible keyboard structure in which, in response to closing of the computer housing lid, the key return spring portions of the keyboard are shifted away from their normal underlying relationships with the keys and the keys are forcibly retracted to a storage/transport orientation in which the overall thickness of the keyboard structure is reduced by an amount essentially equal to the stroke distance of the keys. When the lid is subsequently opened, the key return spring portions are shifted back to their normal underlying relationships with the keys, and the keys are forced outwardly by the return spring portions to their extended, operative orientations above the return spring portions. Incorporated into the collapsible keyboard structure is a cursor position control pointing stick device that is automatically retracted to a collapsed orientation in response to a corresponding collapsing of the keys, and automatically extended back to a use orientation in response to a corresponding return of the keys to their extended use orientations.

20 Claims, 5 Drawing Sheets

COLLAPSIBLE COMPUTER KEYBOARD STRUCTURE WITH ASSOCIATED COLLAPSIBLE POINTING STICK

CROSS-REFERENCE TO RELATED APPLICATION

This application is a continuation-in-part of U.S. application Ser. No. 08/268,818 filed on Jun. 30, 1994, now U.S. Pat. No. 5,532,904, and entitled "COLLAPSIBLE KEYBOARD STRUCTURE FOR A NOTEBOOK COMPUTER RESPONSIVE TO OPENING AND CLOSING OF THE COMPUTER'S LID".

BACKGROUND OF THE INVENTION

1. Field of the Invention

The present invention relates generally to electronic apparatus, and in a preferred embodiment thereof more particularly relates to keyboard structures for portable computers, such as notebook computers, and associated cursor positioning pointing stick devices.

2. Description of Related Art

In recent years the notebook computer has made considerable gains in both popularity and technical sophistication. One factor contributing to the increasing popularity of the notebook computer is its ever decreasing size and weight, a factor arising from the ability to fabricate various components of the computer in smaller and smaller sizes while, in many cases, increasing the power and/or operating speed of such components.

One continuing challenge in the design of notebook computers, however, is the keyboard structure. This design challenge arises from two conflicting design goals—the desire to even further reduce the size of the keyboard structure, and the desirability of having the notebook computer emulate as closely as possible the size and typing "feel" of a desktop computer keyboard.

There are, of course, two dimensional factors which may be varied to reduce the size of a notebook computer keyboard structure—its horizontal dimensions (i.e., its length and width), and its vertical or thickness dimension. The horizontal dimensions of the keyboard are governed by the number, size, and relative spacing of the manually depressible key cap portions of the keyboard, and various reductions in these three dimensional factors may be utilized to reduce the overall length and/or width of the keyboard. However, as will be readily appreciated, a reduction in these three configurational aspects to gain a keyboard size reduction correspondingly lessens the similarity of the notebook computer keyboard in appearance, key arrangement and typing feel to its desktop counterpart.

Similar restraints are also presented when attempts are made to reduce the overall thickness of a notebook computer keyboard. One possibility which has been investigated and attempted is to simply reduce the keystroke distance in the notebook computer keyboard compared to its desktop counterpart. Using this design technique, the overall thickness of the notebook computer in its closed storage and transport orientation may be correspondingly reduced. However, this thickness reduction in the overall notebook computer, achieved by reducing the keyboard keystroke distance, creates what many users consider to be an undesirable typing "feel" difference compared to the longer keystroke distance typically found in a larger desktop computer keyboard.

A different approach previously proposed to reduce the thickness of a notebook computer keyboard has been to provide the keyboard with the capability of being collapsed, in a direction parallel to that of its keystroke direction, when not in use. Potentially, at least, this approach would appear to have promise since a keystroke distance essentially identical to that in a larger desktop computer keyboard could be maintained when the keyboard was in its extended use orientation, while the thickness of the keyboard in its collapsed storage and transportation orientation is substantially reduced.

A disadvantage of this proposed approach has been the inability to incorporate in a collapsible keyboard structure a "pointing stick" type cursor control device. This device, as typically incorporated in a fixed height keyboard, is basically a stick-shaped member that is positioned generally centrally in the keyboard, in the space between a predetermined group of keys, and longitudinally extends parallel to the keystroke direction with the upper end of the pointing stick being at an elevation at or just slightly above the elevation of the top sides of the keys. User finger pressure exerted in a selected direction on the top end of the pointing stick is transmitted to an underlying pressure sensitive electronic circuit. The circuit responsively outputs an electrical signal which is used in a conventional manner to control the display screen position of a cursor.

Heretofore it has not been feasible to incorporate a pointing stick in a collapsible computer keyboard since when the keys are collapsed the upper end of the pointing stick remains at its previous height in which it is now a substantial distance above the elevation of the top sides of the collapsed keys. With the notebook computer lid closed, the outer side of the display screen cannot be brought into close proximity with the top sides of the collapsed keys since the upper end of the pointing stick is in the way. This characteristic of a conventional pointing stick, of course, would eliminate the advantage of the collapsing keyboard. Accordingly, it has heretofore been necessary to use some other type of cursor position control device, such as a mouse, trackball or touch pad, in conjunction with a collapsible keyboard.

As can be readily seen from the foregoing, it would be desirable to provide, in conjunction with a collapsible notebook computer keyboard structure which permits a useful thickness reduction in the closed computer without a corresponding reduction in the operative keystroke distance of the keyboard structure, a pointing stick device that eliminates the abovementioned disadvantage of a conventional pointing stick used with a collapsible keyboard. It is accordingly an object of the present invention to provide such a collapsible keyboard and associated pointing stick apparatus.

SUMMARY OF THE INVENTION

In carrying out principles of the present invention, in accordance with a preferred embodiment thereof, a portable computer, representatively a notebook computer, is provided with a specially designed collapsible keyboard structure. The computer includes a base housing portion having a top side, and a lid housing portion secured to the base housing portion for pivotal movement relative thereto between a closed position in which the lid housing portion extends across and covers the top side, and an open position in which the lid housing portion uncovers and exposes the top side of the base housing portion. The lid housing portion has a screen portion upon which a movable cursor may be displayed.

The collapsible keyboard structure, in a preferred embodiment thereof, includes a key support structure anchored to the base housing and extending across its top side. A series of keys are carried on the top side of the key support structure for vertical movement relative thereto, through a key stroke distance, between upwardly extended operative positions and downwardly retracted nonoperative positions in which the overall vertical thickness of the keyboard structure is reduced by the key stroke distance. Preferably, the keys are secured to the key support structure by scissored linkage arm assemblies having central portions With mutually angled bearing and cam surfaces thereon.

A base structure, representatively a multi-layered signal pad structure with a spaced series of elastomeric key return dome members on its upper side, underlies the key support structure and is carried for horizontal movement relative to the key support structure between a first position in which the key return members underlie and upwardly engage the linkage assembly bearing surfaces and resiliently hold the keys in their upwardly extended operative positions, and a second position in which the key return members are horizontally offset from the bearing surfaces and permit the keys to move to their downwardly retracted nonoperative positions.

Preferably, shifting means are provided for shifting the signal pad structure from its second position to its first position in response to opening of the lid housing portion, and for shifting the signal pad structure from its first position to its second position in response to closing of the lid housing portion. When the signal pad structure is shifted from its second position to its first position, the key return dome members engage the cam surfaces and extend the scissored linkage mechanisms to once again place the dome members in underlying engagement with the bearing surfaces of the linkage assemblies.

Preferably, drive projections are formed on the top side of the signal pad structure and are operative, in response to the shifting of the signal pad structure from its first position to its second position, to engage and move portions of the scissored linkage arm assemblies in a manner forcibly collapsing the assemblies to positively drive the keys from their upwardly extended operative positions to their downwardly retracted nonoperative positions.

According to a primary aspect of the invention, the collapsible keyboard structure also comprises a cursor position control system including a manual force-receiving pointing stick device positioned and extending upwardly between a plurality of the keys and being vertically movable, in response to operation of the aforementioned shifting means, between extended and retracted positions when the keys are correspondingly shifted to their extended and retracted positions. This advantageously permits a pointing stick cursor control structure to be incorporated within the perimeter of a collapsible keyboard array without having to forego the height reduction advantages of the collapsible keys since the pointing stick automatically collapses a distance generally equal to the retraction distance of the keys.

In a preferred embodiment thereof, the collapsible pointing stick device has a top end portion, first and second leg sections having upper end portions pivotally connected to the top end portion of the pointing stick device. The first leg section has a bottom end portion pivotally connected to the key support structure, and the second leg section has a bottom end portion pivotally connected to the base structure. With the pointing stick device in its upwardly extended position the first and leg sections extend vertically in a contiguous, parallel relationship, and with the pointing stick device in its downwardly retracted position the first and second leg sections are pivoted outwardly from one another to a generally inverted "V" configuration.

DETAILED DESCRIPTION

Figure 1:
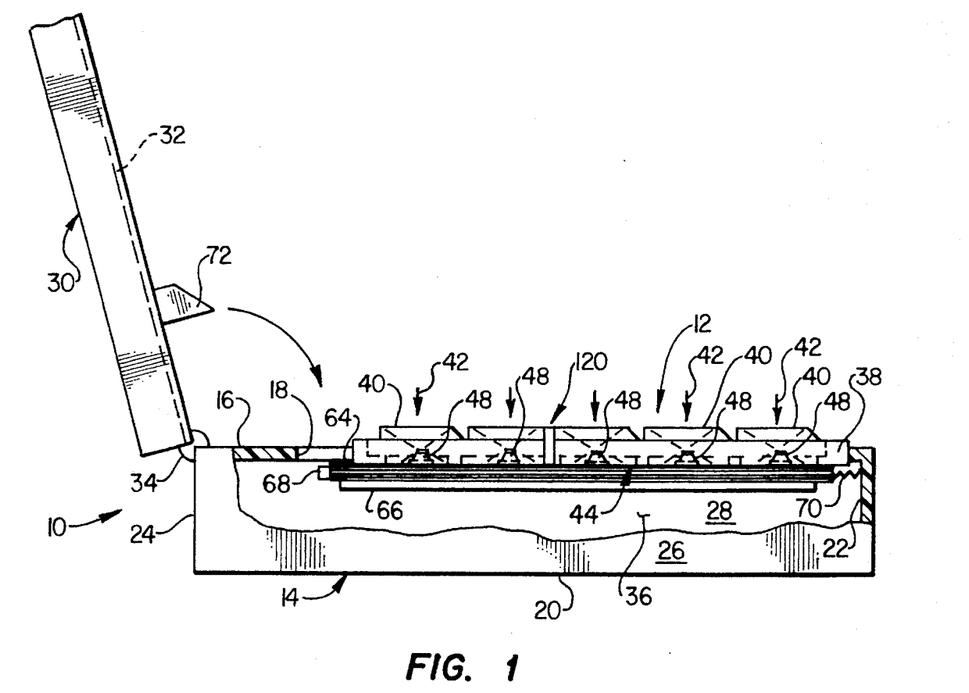
FIG. 1 is a partially sectioned, simplified side elevational view of a notebook computer having a collapsible keyboard structure, and an associated collapsible cursor positioning pointing stick, embodying principles of the present invention, the computer being in an opened orientation and the keyboard structure being in its key-extended use configuration.
Figure 2:
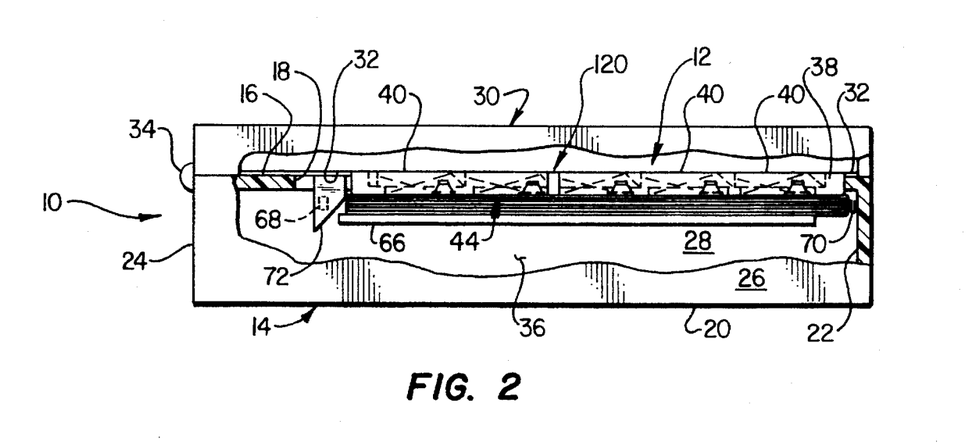
FIG. 2 is a view similar to that in FIG. 1, but with the computer in its closed orientation and the keyboard structure being in its key-retracted storage/transport orientation in which the pointing stick is also retracted.

Referring initially to FIGS. 1 and 2, the present invention provides a portable computer, illustratively a notebook computer 10, having incorporated therein a collapsible keyboard structure 12, with a specially designed collapsible pointing stick device 120 incorporated therein, embodying principles of the present invention. Computer 10 includes a hollow rectangular base housing 14 having a top horizontal side wall 16 with an opening 18 therein; a bottom horizontal side wall 20; front and rear vertical end walls 22,24; and a pair of opposite vertical side walls 26,28.

A hollow rectangular lid housing 30, having a display screen 32 on its front or inner side, is pivotally secured along a hinge joint 34 to a top rear corner portion of the base housing 14. Lid housing 30 may upwardly pivoted to place the computer 10 in an open use orientation (FIG. 1) in which the top side 16 of the base housing 14 is exposed and the display screen 32 forwardly faces the user of the computer, or downwardly pivoted to place the computer 10 in a closed storage and transport orientation (FIG. 2) in which the lid housing extends across and covers the top side of the base housing 14. Suitable latch means (not shown) are provided to releasably retain the lid housing 30 in its FIG. 2 closed orientation.

The collapsible keyboard structure 12 extends across the opening 18 in the top side wall 16 of the base housing 14 and occupies only a relatively small upper portion of the interior 36 of the base housing. Referring now to FIGS. 1, 2 and 4, the keyboard structure basically comprises a relatively thin rectangular monoblock support structure 38 that horizontally extends across the base housing top side opening 18 and is suitably anchored to the base housing 14; a series of manually depressible key cap members 40 carried for vertical movement relative to the support structure 38 (as indicated by the arrows 42 in FIG. 1) through a keystroke distance D (see FIG. 3A); and a rectangularly configured, multilayer signal pad structure 44 that underlies the support structure 38 and is transverse to the keystroke directions 42.

The signal pad structure 44, which is of a generally conventional construction, is shown in simplified exploded form in FIG. 4 and includes, from top to bottom, (1) a plastic dome sheet 46 having a spaced series of rubber key return domes 48 projecting upwardly from its top side; (2) a plastic top circuit sheet 50 having a spaced series of circular, electrically conductive pads 52 disposed on its bottom side, aligned with the domes 48, and connected to surface trace circuitry (not shown) formed on the sheet 50; (3) a plastic spacer sheet 54 having a spaced series of circular openings 56 formed therein and underlying the pads 52; (4) a plastic bottom circuit sheet 58 having a spaced series of circular, electrically conductive pads 60 disposed on its top side, aligned with the sheet openings 56, and connected to surface trace circuitry (not shown) formed on the sheet 58; and (5) a metal backing sheet 62.

The five sheet members 46,50,54,58,62 are suitably held in their indicated stacked orientation to combinatively define the overall signal pad structure 44. As illustrated in FIGS. 1–3B, the signal pad structure 44 has opposite side edge portions that are slidably retained between two sets of horizontal rail member pairs 64,66 formed on the interior sides of the base housing side walls 26 and 28. For purposes later described, the rail member pairs 64,66 support the signal pad structure 44 for horizontal front-to-rear movement relative to the base housing 14, and thus relative to the keyboard support structure 38, between a first position (FIGS. 1 and 3A) in which the left or rear side edge of the signal pad structure 44 abuts a pair of stop projections 68 formed on the inner sides of the base housing side walls 26 and 28, and a second position (FIGS. 2 and 3B) in which the signal pad structure 44 is forwardly shifted away from the stop projections 68.

With the computer lid housing 30 in its FIG. 1 open position, a plurality of schematically depicted compression spring members 70, interposed between the right or front edge of the signal pad structure 44 and the front base housing end wall 22, resiliently hold the signal pad structure 44 in its first position. However, as the lid housing 30 is subsequently closed, a spaced pair of tapered cam projections 72 disposed on the front or inner side of the lid housing 30 engage the rear side edge of the signal pad structure 44 and drive it to its second position (FIG. 2) against the resilient resistance force of the spring members 70. When the lid housing 30 is opened again, the cam projections 72 are lifted out of engagement with the signal pad structure 44 to thereby permit the spring members 70 to drive the signal pad structure 44 back to its FIG. 1 first position.

In a manner subsequently described herein this selective shifting of the signal pad structure 44 relative to the keyboard support structure 38 is operative to automatically shift the key cap members 40 between a FIG. 3A extended operating orientation (when the signal pad structure 44 is in its leftwardly shifted first position), and a FIG. 3B retracted position (when the signal pad structure 44 is in its rightwardly shifted second position).

Turning now to FIGS. 3A, 3B, 5A and 5B, each of the key cap members 40 has a hollow, rectangular molded plastic body with a top side wall 74 with a downwardly and forwardly sloping front edge portion 76, and an open bottom side 78. A scissored linkage assembly 80 is secured to the bottom of each of the key cap members 40 and includes a first pair of scissor arms 82 and a second pair of scissor arms 84, with longitudinally intermediate portions of the arms 82 being pivotally connected to longitudinally intermediate portions of the arms 84 as indicated.

First ends of the arms 82 are joined by a cylindrical rod 86 pivotally anchored in tabs 88 projecting downwardly from the top key member wall 74, while the opposite ends of the arms 82 have outwardly projecting cylindrical pins 90 formed thereon and slidingly received in a slot 92 formed in the bottom side of the support structure 38. First ends of the arms 84 are joined by a cylindrical rod 94 having its opposite ends pivotally anchored in tabs 96 on the bottom side of the support structure 38, while the opposite ends of the arms 84 have outwardly projecting cylindrical pins 98 slidingly received in slots 100 formed on the underside of the key cap member 40.

Longitudinally intermediate portions of the scissor arms 84 are interconnected by a joining plate structure 102 having, on its underside, a bottom bearing surface 104, and a forwardly facing cam surface 106 extending at an angle to the bearing surface 104. The scissored linkage assembly 80 is movable relative to its associated key cap member 40 between an extended position shown in FIGS. 3A and 5A, and a retracted position shown in FIGS. 3B and 5B.

Figure 3A:
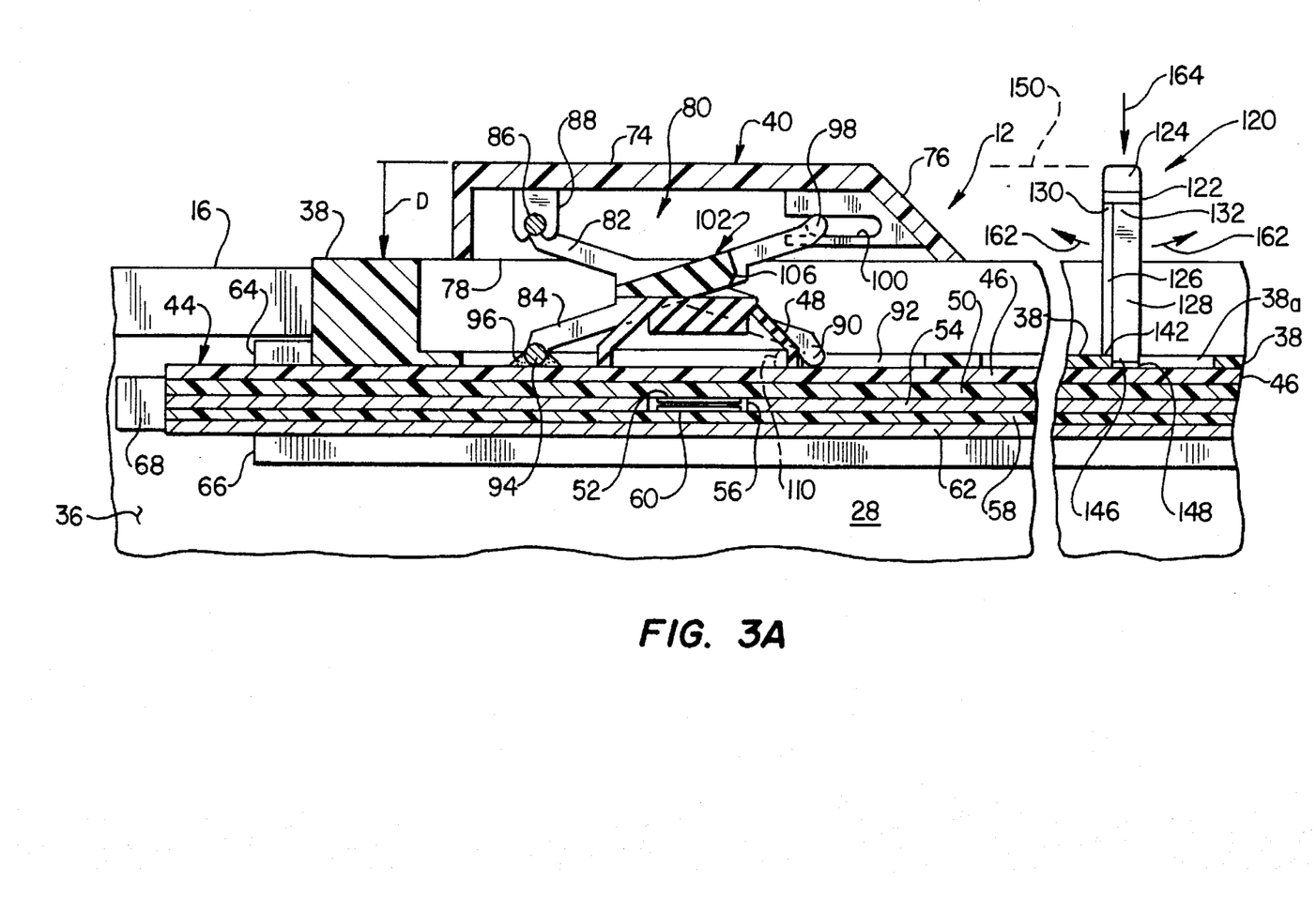
FIG. 3A is an enlarged scale cross-sectional detail view of a portion of the keyboard structure with the keyboard key cap members and pointing stick device in their upwardly extended use positions.
Figure 3B:
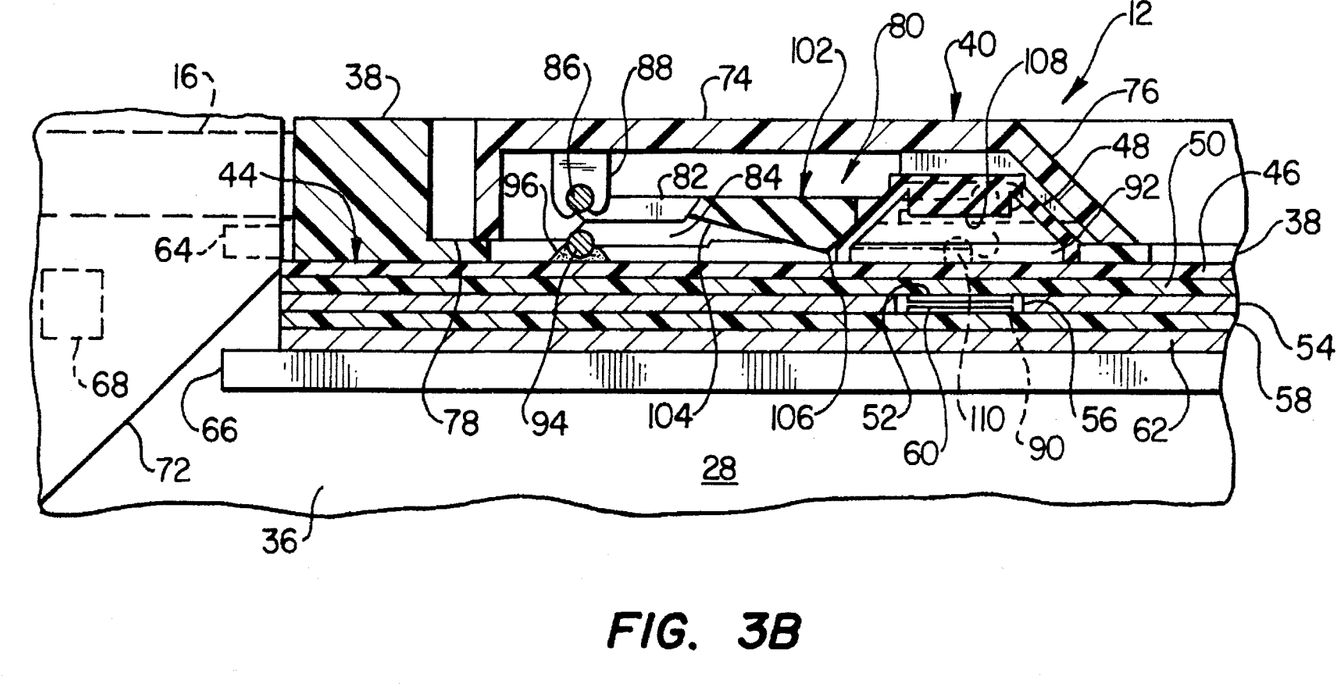
FIG. 3B is an enlarged scale cross-sectional detail view of the FIG. 3A keyboard structure portion with the key cap members in their downwardly retracted storage/transport positions.
Figure 4:
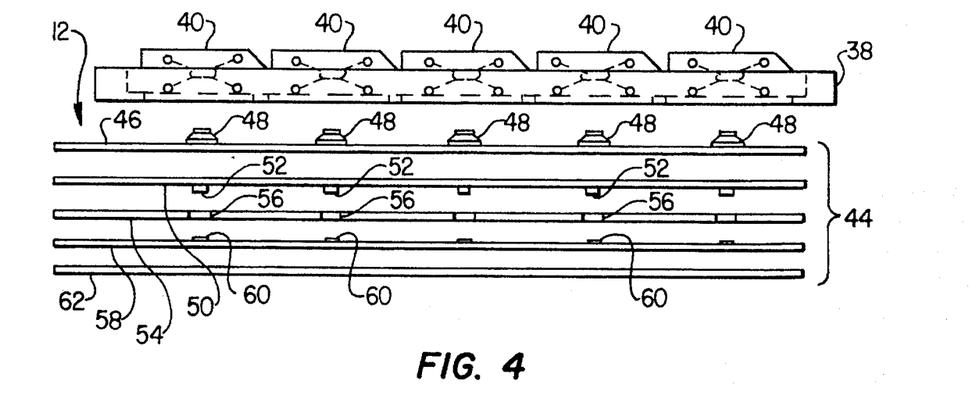
FIG. 4 is a highly schematic exploded side elevational view of the keyboard structure with the pointing stick device removed therefrom for illustrative clarity.
Figure 5A:
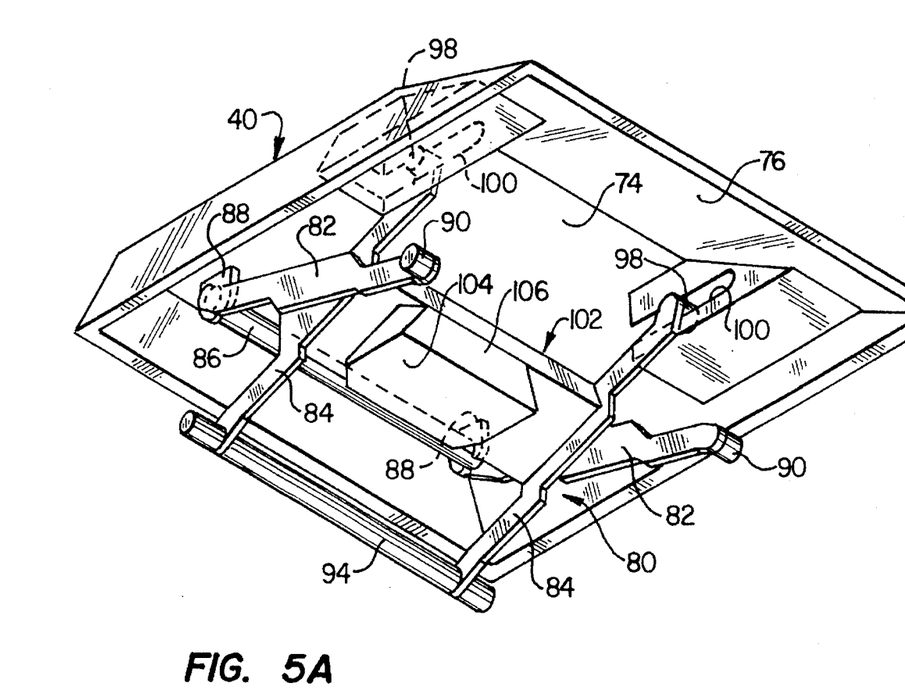
FIGS. 5A and 5B are enlarged scale bottom side perspective views of a key cap member respectively illustrating a scissored support portion thereof in its extended and retracted position.
Figure 5B:
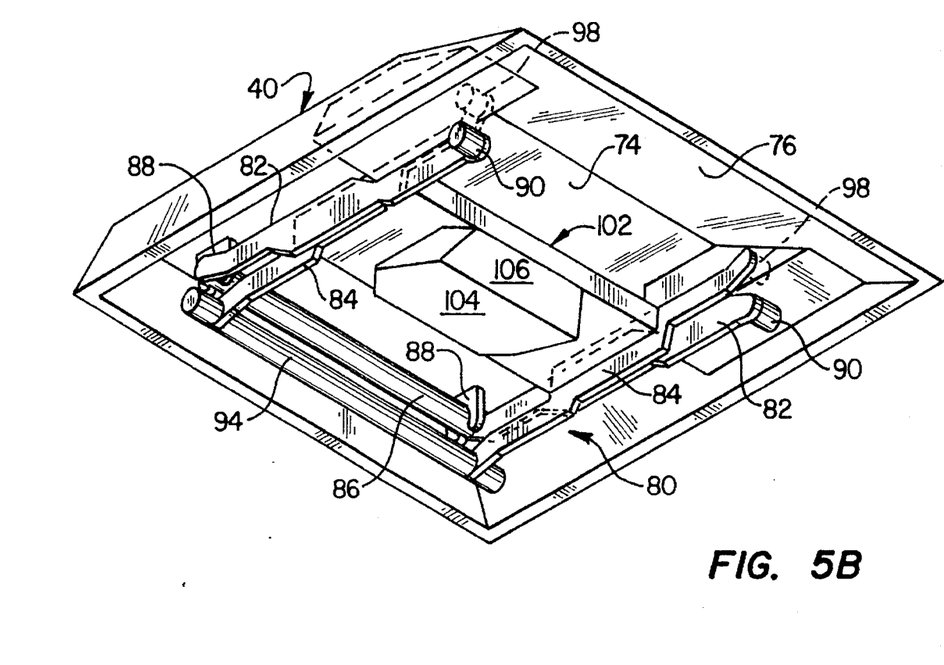
Figure 6:
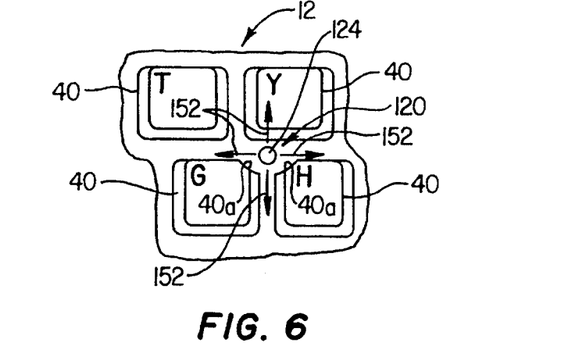
FIG. 6 is an enlarged scale top plan view of the retractable pointing stick device and adjacent key cap members.

Referring now to FIGS. 3A and 3B, with the lid housing 30 opened, the signal pad structure 44 is driven to its FIG. 3A position (by the spring members 70 shown in FIG. 1), and the key cap members 40 are in their FIG. 3 operatively extended positions in which the scissored linkage assemblies 80 are in their extended positions, with the bearing surfaces 104 of the linkage assemblies 80 overlying and downwardly engaging the upper ends of the resilient key return domes 48.

When any of the key cap members 40 is manually depressed, against the resilient resistance of its associated return dome 48, the dome is downwardly deformed to cause an internal projection 108 therein to be downwardly pressed against a portion of the dome sheet 46 underlying the projection 108. This, in turn, causes the contact pad pair 52,60 underlying the projection 108 to be brought into engagement with one another and cause their associated circuitry to output an electrical signal indicative of the striking of their associated key cap member. When the key cap member is released from its manually depressed orientation, it is automatically returned upwardly to its FIG. 3A position by the resilient force of its underlying key return dome 48 which functions as a return spring means.

When the signal pad structure 44 is forwardly shifted from its FIG. 3A position to its FIG. 3B position, in response to closing the lid housing 30 as previously described, the key return domes 48 are forwardly moved out from under their associated scissor linkage bearing surfaces 104, and the scissored linkage assemblies 80 are forcibly driven to their retracted FIG. 3B positions. This, in turn, downwardly drives the key cap members 40 to their FIG. 3B retracted positions, thereby reducing the overall thickness of the collapsible keyboard structure 12 by the keystroke distance D.

The forcible retraction of the key cap members 40 is effected by a spaced series of upward projections 110 formed on the top side of the dome sheet 46. Pairs of the projections 110 are positioned on opposite sides of the domes 48 and located immediately behind the opposite ends of the scissor arm pins 90. When the signal pad structure 44 is rightwardly driven away from its FIG. 3A position the projections 110 rightwardly engage and drive the pins 90 to thereby forcibly move the scissored linkage assemblies 80 from their FIG. 3A extended positions to their retracted FIG. 3B positions. Alternatively, the projections 110 could be omitted and the key cap members 40 permitted to fall by gravity to their retracted FIG. 3B positions when the signal pad structure 44 is rightwardly driven from its FIG. 3A position to its FIG. 3B position.

When the lid housing 30 is opened again, the resulting leftward or rearward driven movement of the signal pad structure 44 causes the sloping rear side surfaces of the key return domes 48 to rearwardly engage the forwardly and upwardly sloped cam surfaces 106 of the linkage assemblies 80 in a manner forcing the linkage assemblies 80 back to their FIG. 3A extended positions in which the upper ends of the domes 48 underlie and engage the linkage assembly bearing surfaces 104 to thereby return the key cap members 40 to their upwardly extended operative positions.

From the foregoing it can be seen that the collapsible keyboard structure 12 of the present invention effectively reduces the thickness of the keyboard structure in its FIG. 3B storage/transport orientation by the key stroke distance D, and automatically brings the keyboard structure to this orientation in response to the closure of the lid housing 30. Accordingly, the key stroke distance D does not have to be undesirably reduced (compared to the corresponding key stroke distance of a desktop computer keyboard) to reduce the storage/transport thickness of the keyboard structure 12.

While the keyboard structure 12 has been representatively depicted as having the keyboard support structure 38 fixedly secured to the base housing 14, with the signal pad structure 44 being shiftable relative to the support structure 38, it will be appreciated that, alternatively, the keyboard support structure 38 could be shifted relative to the signal pad structure 44 if desired.

Additionally, while the key structures 40 have been representatively illustrated as being supported on the keyboard carrying structure 38 using scissored linkage assemblies, other means of supporting the key cap members 40 for vertical movement could be utilized if desired. Moreover, spring return means other than the rubber key return domes 48 could be provided for forward and rearward shifting relative to the key cap members if desired. Furthermore, while the collapsible keyboard structure 12 of the present invention has been representatively illustrated and described as being incorporated in a portable computer, it will be readily appreciated by those of skill in this particular art that the collapsible keyboard structure could also be advantageously utilized in other types of electronic devices having display screens such as, for example, calculators and other types of computers.

The Collapsible Pointing Stick Device 120

With initial reference to FIGS. 1 and 2, the pointing stick 120 of the present invention may be manually used in a generally conventional manner to control the position of a cursor on the display screen 32 and, according to a primary aspect of the present invention, is shiftable from an upwardly extended use position (FIG. 1) in which its upper end is generally level with or slightly above the elevation of the top sides of the key cap members 40 in their upwardly extended use positions, to a storage and transport orientation (FIG. 2) in which, in response to collapse of the key cap members 40 as previously described, the pointing stick 120 is downwardly retracted by an amount generally equal to the keystroke distance so that the top end of the retracted pointing stick 120 is generally level with the elevation of the top sides of the retracted key cap members 40.

Importantly, the collapsible structure and operation of the pointing stick 120 as subsequently described herein permits it to be incorporated with the collapsible keyboard structure 12 without undesirably increasing the lessened height requirement of the keyboard structure. Stated in another manner, as somewhat schematically indicated in FIG. 2, with the lid 30 closed the display screen 32 is very close to the tops of the collapsed key cap members 40. This closeness, and corresponding vertical space savings in the computer, is made possible by the pointing stick's ability to collapse with the key caps as subsequently described herein. If a conventional, noncollapsible pointing stick was utilized its upper end would project upwardly an appreciable distance beyond the top sides of the collapsed key cap members and require that the screen 32 be maintained at a substantially higher level relative to the keV cap members when the lid 30 is closed.

Turning now to FIGS. 3A, 6, 7A and 7B, the pointing stick 120 of the present invention is a vertically oriented structure disposed in the collapsible keyboard 12 (representatively having a conventional "QWERTY" key layout) between corner portions of the "G", "H" and "Y" keys 40 (see FIG. 6), with the indicated key corner portions 40a being appropriately beveled to facilitate typing finger access to the top end of the pointing stick.

Figure 7A:
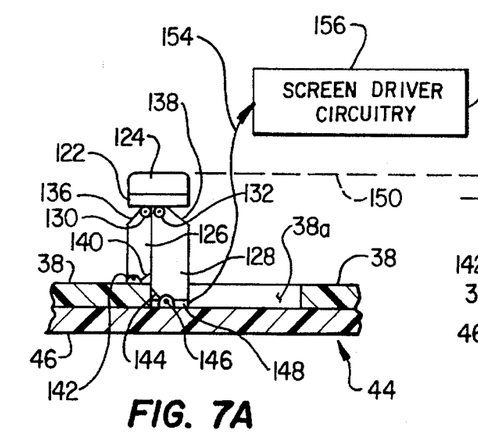
FIGS. 7A and 7B are enlarged scale side elevational views of the pointing stick device respectively illustrating it in its upwardly extended and downwardly retracted positions.
Figure 7B:
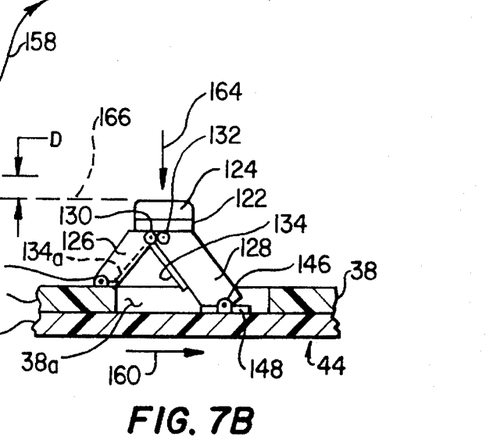

As best illustrated in FIGS. 3A, 7A and 7B, collapsible pointing stick 120 has a top end portion 122 covered with a suitable elastomeric material 124 to facilitate non-slip finger engagement thereof, and a depending pair of side-by-side leg portions 126,128 having top ends thereof pivoted as at 130,132 to the underside of the top end portion 122 in a manner permitting the legs 126,128 to pivot relative to the top end portion 122 between (1) an upright use orientation (see FIGS. 3A and 7A) in which the legs 126,128 are in a vertical, side-to-side use orientation, and (2) a retracted storage/transport orientation (see FIG. 7B) in which the legs 126,128 are swung outwardly away from one another to a generally inverted "V" orientation.

To facilitate this pivoting at the underside of the top pointing stick end portion 122 the upper ends of the legs 126,128 are respectively tapered as at 136,138 (see FIG. 7A). With the legs 126,128 in their FIG. 7A upright use orientation they are bracingly interlocked with one another by means of a spline 134 formed on leg 128 (see FIG. 7B) and received in a complementarily configured groove 134a formed in the opposite leg 126.

The pointing stick leg 126 has a lower end which is tapered as at 140 and is pivotally connected, as at 142, to the upper side of the support structure 38 at the left side of an appropriate opening 38a extending downwardly therethrough to the underlying dome sheet 46. The bottom end of the other leg 128 is tapered as at 144, extends downwardly through the support structure opening 28a, and is pivotally connected, as at 146, to the top side of the dome sheet 46. As illustrated, the lower end of the leg 128 overlies a pressure-sensitive electronic circuit structure 148 of conventional construction and operation.

With the key caps 40 in their FIG. 3A upwardly extended use orientation, the pointing stick 120 is also in its upwardly extended use orientation (see FIGS. 3A and 7A) in which the upper end of the pointing stick 120 is generally level with the top sides of the key cap members 40 as indicated by the dashed lines 150 in FIGS. 3A and 7A. In this upright use orientation the pointing stick 120 may be used in the same general manner as a conventionally configured pointing stick to selectively vary the position of a cursor (not shown) on the display screen 32. Specifically, as indicated by the arrows 152 in FIG. 6, the computer user may exert finger pressure on the upper end 124 of the pointing stick in the direction the user wishes to move the cursor on the screen 132.

This finger pressure is transmitted down the pointing stick leg 128 to the underlying circuitry 148 which, in a conventional manner, senses the direction and magnitude of the force and responsively transmits an electric signal 154 (see FIG. 7A) to the computer's screen driver circuitry 156. In turn, the screen driver circuitry 156 outputs an electrical signal 158 used in a conventional manner to appropriately reposition the cursor on the screen 132.

When, as previously described herein, the multilayer signal pad 44 is subsequently shifted to the right (as indicated by the arrow 160 in FIG. 7B) to retract the key cap members 40 to their FIG. 3B storage/transport orientations, the legs 126,128 of the pointing stick 120 are forcibly pivoted apart from one another (as indicated by the arrows 162 in FIG. 3A) to bring the legs 126,128 to their FIG. 7B orientation, thereby downwardly retracting the upper end of the pointing stick 120 as indicated by the arrows 164 in FIGS. 3A and 7B. As indicated by the dashed line 166 in FIG. 7B, this lowers the upper end of the pointing stick 120, by a distance generally equal to the key stroke distance D, to the level of the top sides of the now retracted key cap members 40. When the multi-layer signal pad 44 is subsequently shifted back to the left, and the retracted key cap members 40 are upwardly extended to their use orientations, the pointing stick 120 is automatically forced back to its FIG. 7A upwardly extended use orientation.

The foregoing detailed description is to be clearly understood as being given by way of illustration and example only, the spirit and scope of the present invention being limited solely by the appended claims.

What is claimed is:

1. A keyboard structure for an electronic device having a screen upon which a movable cursor may be displayed, said keyboard structure comprising:

a keyboard support structure;

a mutually spaced series of keys each carried on said keyboard support structure for movement relative thereto, in a first direction between extended use and retracted storage/transport positions;

resilient means associated with said series of keys and operative to resiliently bias them toward said extended use positions thereof;

cursor positioning means operative to generate a signal useable to selectively vary the screen position of the cursor, said cursor positioning means including a manual force-receiving pointing stick device positioned and extending outwardly between a plurality of said keys, said pointing stick device being supported for shifting movement in said first direction between extended use and retracted storage/transport positions; and shifting means operable to selectively and forcibly shift said pointing stick device between said extended use and retracted storage/transport positions thereof.

2. The keyboard structure of claim 1 wherein said keyboard structure is a computer keyboard structure.

3. The keyboard structure of claim 2 wherein said computer keyboard structure is a portable computer keyboard structure.

4. The keyboard structure of claim 1 wherein:

said shifting means are further operable to forcibly shift said keys to said extended positions thereof during shifting of said pointing stick device to its extended position, and to forcibly shift said keys to said retracted positions thereof during shifting of said pointing stick device to its retracted position.

5. The keyboard structure of Claim 4 wherein:

said resilient means and said series of keys are shiftable relative to one another between a first position in which said resilient means engage said series of keys and resiliently bias them toward said extended positions thereof, and a second position in which said resilient means are disengaged from said series of keys and permit them to be moved to said retracted positions thereof without deforming said resilient means; and said shifting means are operable to selectively shift said resilient means and said series of keys between said first and second positions thereof.

6. The keyboard structure of claim 5 wherein:

said shifting means are further operative to forcibly move said series of keys to said retracted positions thereof in response to relative movement of said resilient means and said series of keys from said first position to said first position.

7. The keyboard structure of claim 5 wherein:

said shifting means are operable to create a relative positional shift between said resilient means and said series of keys in a second direction transverse to said first direction.

8. The keyboard structure of claim 5 wherein:

said resilient means have spaced apart deformable portions that are aligned with and underlie said series of keys when said resilient means and said series of keys are in said first position thereof.

9. The keyboard structure of claim 8 wherein:

said deformable portions of said resilient means are defined by a spaced series of elastomeric key return dome members.

10. The keyboard structure of claim 5 wherein:

said resilient means are operative to engage said series of keys, and drive them to said extended positions thereof, in response to a shift of said resilient means and said series of keys from said second position thereof to said first position thereof.

11. The keyboard structure of claim 1 wherein:

said pointing stick device has first and second relatively pivotable leg sections which, with said pointing stick device in said extended position thereof, are pivoted into a contiguous, generally parallel relationship and, with said pointing stick device in said retracted position thereof, are pivoted outwardly away from one another to a generally V-shaped relationship.

12. A collapsible keyboard structure for an electronic device having a screen upon which a movable cursor may be displayed, said keyboard structure comprising:

a key support structure having top and bottom sides;

a series of keys each carried on said top side of said key support structure for vertical movement relative thereto, through a vertical key stroke distance, between extended and retracted positions;

a base structure carried beneath said key support structure and having a top side facing said bottom side of said key support structure;

a spaced series of resilient key return members disposed on said top side of said base structure, said key support structure and said base structure being horizontally shiftable relative to one another between a first position in which said key return members underlie and resiliently hold said keys in said extended positions thereof, and a second position in which said key return members permit said keys to be moved from said extended positions thereof to said retracted positions thereof without vertically compressing said resilient key return members;

cooperatively engageable means on said keys and said base structure for forcibly driving said keys from said extended positions thereof to said retracted positions thereof in response to shifting of said base and key support structures from said first position thereof to said second position thereof; and cursor positioning means operative to generate a signal useable to selectively vary the screen position of the cursor, said cursor positioning means including a manual force-receiving pointing stick device positioned and extending outwardly between a plurality of said keys, said pointing stick device being connected to said key support structure and said base structure and being configured to be shifted between upwardly extended and downwardly retracted positions in response to the shifting of said base and key support structures respectively to said first and second positions thereof.

13. The collapsible keyboard structure of claim 12 wherein said collapsible keyboard structure is a collapsible computer keyboard structure.

14. The collapsible keyboard structure of claim 13 wherein said collapsible computer keyboard structure is a collapsible portable computer keyboard structure.

15. The collapsible keyboard structure of claim 12 wherein:

said pointing stick device has a top end portion, first and second leg sections having upper end portions pivotally connected to said top end portion of said pointing stick device, said first leg section having a bottom end portion pivotally connected to said key support structure, and said second leg section having a bottom end portion pivotally connected to said base structure.

16. A portable computer comprising:

a base housing portion having a top side;

a lid housing portion secured to said base housing portion for pivotal movement relative thereto between a closed position in which said lid housing portion extends across and covers said top side, and an open position in which said lid housing portion uncovers and exposes said top side, said lid housing portion having a screen thereon on which a movable cursor may be displayed; and a collapsible keyboard structure extending along said top side of said lid housing portion and including:

a key support structure, a series of keys each carried on said key support structure for vertical movement relative thereto, in a key stroke direction, between extended and retracted positions, a cursor position control system including a manual force-receiving pointing stick device positioned and extending upwardly between a plurality of said keys and being vertically movable between extended and retracted positions, and shifting means operative in response to movement of said lid housing portion to said closed position thereof to drive said keys and said pointing stick device to said retracted positions thereof, and operative in response to movement of said lid housing portion to said open position thereof to drive said keys and said pointing stick device to said extended positions thereof.

17. The portable computer of claim 16 wherein:

said portable computer further comprises a base structure underlying said key support structure and being shiftable relative thereto in a direction transverse to said key stroke direction, each of said keys and said pointing stick device is interconnected between said key support structure and said base structure, and said shifting means include means for forcibly creating a relative shifting between said key support structure and said base structure, in opposite directions transverse to said key stroke direction, in response to opening and closing said lid portion.

18. The portable computer of claim 17 wherein:

said pointing stick device has a top end portion, first and second leg sections having upper end portions pivotally connected to said top end portion of said pointing stick device, said first leg section having a bottom end portion pivotally connected to said key support structure, and said second leg section having a bottom end portion pivotally connected to said base structure.

19. The portable computer of claim 18 wherein:

said key support is a generally rectangular monoblock support structure.

20. The portable computer of claim 18 wherein:

said base structure is a multilayered signal pad structure.

* * * * *